United States Patent
Sun et al.

(10) Patent No.: US 12,107,785 B2
(45) Date of Patent: Oct. 1, 2024

(54) SRS COVERAGE ENHANCEMENT

(71) Applicant: Apple Inc., Cupertino, CA (US)

(72) Inventors: Haitong Sun, Irvine, CA (US);
Huaning Niu, San Jose, CA (US);
Hong He, Cupertino, CA (US); Wei Zeng, San Diego, CA (US); Dawei Zhang, Saratoga, CA (US); Chunxuan Ye, San Diego, CA (US); Weidong Yang, San Diego, CA (US); Chunhai Yao, Beijing (CN); Jie Cui, San Jose, CA (US); Yang Tang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 17/437,960

(22) PCT Filed: Oct. 12, 2020

(86) PCT No.: PCT/CN2020/120306
§ 371 (c)(1),
(2) Date: Sep. 10, 2021

(87) PCT Pub. No.: WO2022/077143
PCT Pub. Date: Apr. 21, 2022

(65) Prior Publication Data
US 2022/0303087 A1 Sep. 22, 2022

(51) Int. Cl.
*H04L 5/00* (2006.01)
*H04W 72/0446* (2023.01)
*H04W 72/23* (2023.01)

(52) U.S. Cl.
CPC ....... *H04L 5/0048* (2013.01); *H04W 72/0446* (2013.01); *H04W 72/23* (2023.01)

(58) Field of Classification Search
None
See application file for complete search history.

(56) References Cited

U.S. PATENT DOCUMENTS

2019/0149269 A1    5/2019  Chatterjee
2021/0367727 A1*  11/2021  Go .................... H04L 5/0048
(Continued)

FOREIGN PATENT DOCUMENTS

WO      2020018534 A1    1/2020

OTHER PUBLICATIONS

International Search Report for PCT Patent Application No. PCT/CN2020/120306; mailed Jul. 12, 2021.
Qualcomm Inc. "Enhancements on SRS flexibility, switching, coverage and capacity"; 3GPP RSG RAN WG1 Meeting #102-e R1-2006795; Aug. 28, 2020.
(Continued)

*Primary Examiner* — Brian S Roberts
(74) *Attorney, Agent, or Firm* — Kowert, Hood, Munyon, Rankin & Goetzel, P.C.

(57) ABSTRACT

Apparatuses, systems, and methods for sounding reference signal (SRS) coverage enhancement. A user equipment device (UE) may receive a configuration for SRS time domain bundling from a base station and may transmit, to the base station, at least one SRS transmission in accordance with the configuration. The configuration may include an indication of (and/or indicate) one or more SRS transmission occasions. The configuration may be communicated via higher layer signaling or physical layer signaling. The RRC parameter may be an SRS-ResourceSet parameter or an SRS-Resource parameter and may include a nrofSlots parameter to indicate the number of slots, where a slot may correspond to an SRS transmission occasion. The MAC CE may include at least four bits indicating the number of slots. The DCI may include at least one field indicating the number of slots.

20 Claims, 17 Drawing Sheets

(56) References Cited

U.S. PATENT DOCUMENTS

| | | | |
|---|---|---|---|
| 2022/0029861 A1* | 1/2022 | Shahmohammadian | ................. H04W 72/0446 |
| 2022/0103324 A1* | 3/2022 | Ly | .................. H04L 5/0048 |
| 2023/0009319 A1* | 1/2023 | Manolakos | ............ H04L 27/261 |
| 2023/0067551 A1* | 3/2023 | Wu | .................. H04L 5/0094 |
| 2023/0147579 A1* | 5/2023 | Go | .................. H04L 5/0053 370/329 |
| 2023/0179368 A1* | 6/2023 | Nilsson | ............... H04L 25/0204 370/329 |
| 2023/0216632 A1* | 7/2023 | Go | .................. H04L 5/0094 370/329 |
| 2023/0231682 A1* | 7/2023 | Abdelghaffar | ........ H04L 5/0051 370/330 |

OTHER PUBLICATIONS

ZTE "Enhancements on SRS flexibility, coverage and capacity"; 3GPP TSG RAN WG1 Meeting #102-e R1-2005459; Aug. 28, 2020.

Extended European Search Report for EP Patent Application No. 20956925.0; Apr. 24, 2024.

Mediatek Inc "Enhancements on SRS flexibility, coverage and capacity"; 3GPP TSG RAN WG1 #102 R1-2005622; Aug. 17, 2020.

Huawei et al. "Enhancements on SRS for Rel-17"; 3GPP TSG RAN WG1 Meeting #102-e R1-2005247; Aug. 17, 2020.

Huawei et al. "Summary of remaining details of SRS design"; 3GPP TSG RAN WG1 R1-1800090; Jan. 22, 2018.

Office Action for CN Patent Application No. 202080106115.2; Jul. 26, 2024.

ZTE "Enhancements on SRS flexibility, coverage and capacity"; 3GPP TSG RAN WG1 Meeting #102-e R1-2006963; Aug. 17, 2020.

* cited by examiner

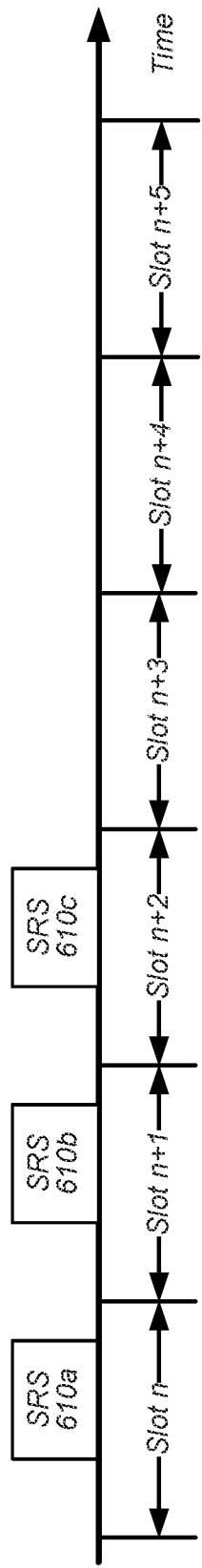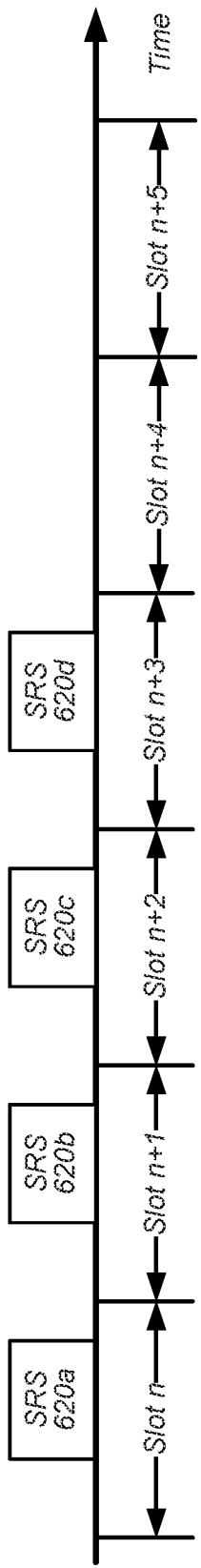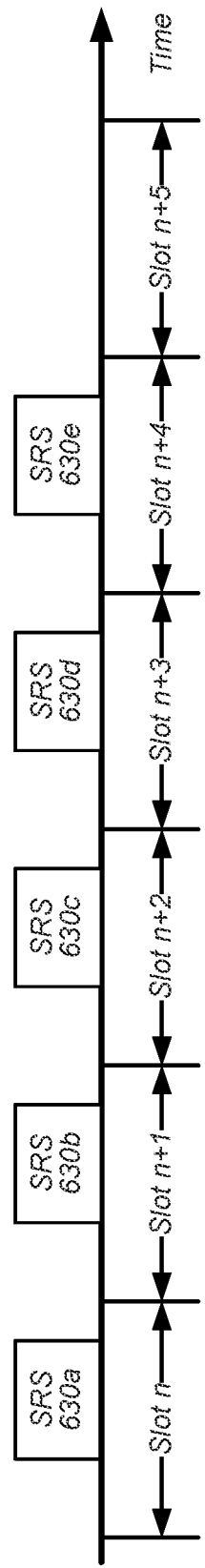
FIG. 6A
FIG. 6B
FIG. 6C

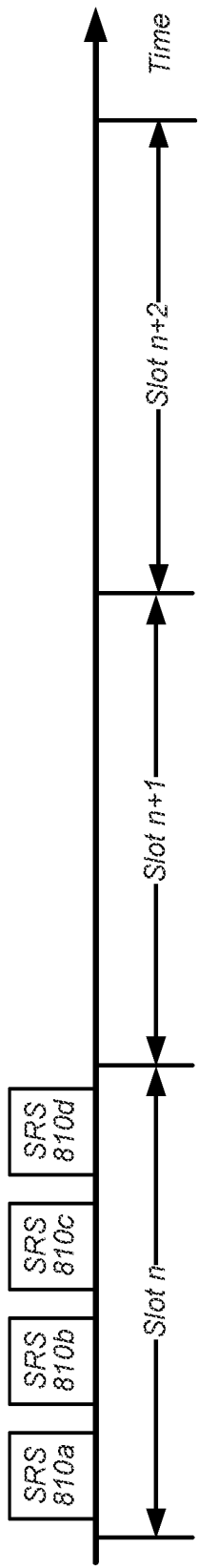
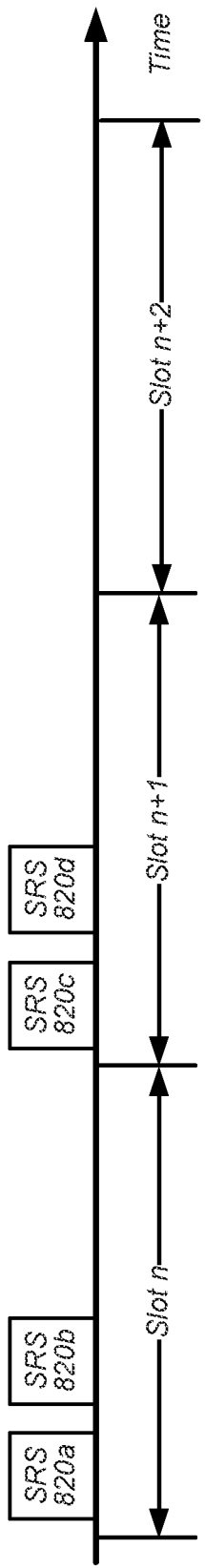
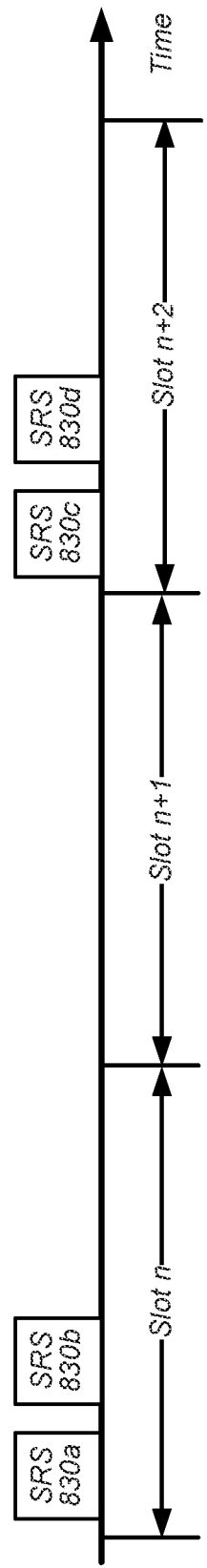
FIG. 8A
FIG. 8B
FIG. 8C

```
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet)) OF SRS-ResourceId    OPTIONAL, -- Cond
    resourceType                CHOICE {
        aperiodic                   SEQUENCE {
            aperiodicSRS-ResourceTrigger    INTEGER (1..maxNrofSRS-TriggerStates-1),
            csi-RS                          NZP-CSI-RS-ResourceId                                   OPTIONAL, -- Cond
            slotOffset                      INTEGER (1..32)                                         OPTIONAL, -- Need S
            ...,
            aperiodicSRS-ResourceTriggerList    SEQUENCE (SIZE(1..maxNrofSRS-TriggerStates-2))
                                                    OF INTEGER (1..maxNrofSRS-TriggerStates-1)      OPTIONAL, -- Need M
        },
        semi-persistent             SEQUENCE {
            associatedCSI-RS            NZP-CSI-RS-ResourceId                                       OPTIONAL, -- Cond
            ...
        },
        periodic                    SEQUENCE {
            associatedCSI-RS            NZP-CSI-RS-ResourceId                                       OPTIONAL, -- Cond
            ...
        }
    },
    usage                       ENUMERATED {beamManagement, codebook, nonCodebook, antennaSwitching},
    nrofSlots                   ENUMERATED {n2,n4,n8}                                               OPTIONAL, -- Need S
<unchanged part omitted>
}
```

*FIG. 9A*

```
SRS-ResourceSet ::=      SEQUENCE {
    srs-ResourceSetId        SRS-ResourceSetId,
    srs-ResourceIdList       SEQUENCE (SIZE(1..maxNrofSRS-ResourcesPerSet)) OF SRS-ResourceId     OPTIONAL, -- Cond
    resourceType             CHOICE {
        aperiodic                SEQUENCE {
            aperiodicSRS-ResourceTrigger    INTEGER (1..maxNrofSRS-TriggerStates-1),
            csi-RS                          NZP-CSI-RS-ResourceId                                 OPTIONAL, -- Cond
            slotOffset                      INTEGER (1..32)                                       OPTIONAL, -- Need S
            ...,
            [[
            aperiodicSRS-ResourceTriggerList    SEQUENCE (SIZE(1..maxNrofSRS-TriggerStates-2))
                                                    OF INTEGER (1..maxNrofSRS-TriggerStates-1)   OPTIONAL -- Need M
            ]]
        },
        semi-persistent          SEQUENCE {
            associatedCSI-RS         NZP-CSI-RS-ResourceId                                        OPTIONAL, -- Cond
            ...
        },
        periodic                 SEQUENCE {
            associatedCSI-RS         NZP-CSI-RS-ResourceId                                        OPTIONAL, -- Cond
            ...
        }
    },
    usage                    ENUMERATED {beamManagement, codebook, nonCodebook, antennaSwitching},
    SRSRepetitionSymbolOffset    INTEGER (0..12)                                                  OPTIONAL, -- Need S
    nrofSRSRepetitionPerSlot     INTEGER (1..14)                                                  OPTIONAL, -- Need S
}
<unchanged part omitted>
```

FIG. 9B

```
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet)) OF SRS-ResourceId   OPTIONAL, -- Cond
    resourceType                CHOICE {
        aperiodic                   SEQUENCE {
            aperiodicSRS-ResourceTrigger    INTEGER (1..maxNrofSRS-TriggerStates-1),
            csi-RS                          NZP-CSI-RS-ResourceId                                   OPTIONAL, -- Cond
            slotOffset                      INTEGER (1..32)                                         OPTIONAL, -- Need S
            ...,
            [[
            aperiodicSRS-ResourceTriggerList    SEQUENCE (SIZE(1..maxNrofSRS-TriggerStates-2))
                                                    OF INTEGER (1..maxNrofSRS-TriggerStates-1)      OPTIONAL -- Need M
            ]]
        },
        semi-persistent             SEQUENCE {
            associatedCSI-RS            NZP-CSI-RS-ResourceId                                       OPTIONAL, -- Cond
            ...
        },
        periodic                    SEQUENCE {
            associatedCSI-RS            NZP-CSI-RS-ResourceId                                       OPTIONAL, -- Cond
            ...
        }
    },
    usage                       ENUMERATED {beamManagement, codebook, nonCodebook, antennaSwitching},
    SRSRepitionSymbolOffset     INTEGER (0..12)                                                     OPTIONAL, -- Need S
    nrofSRSRepitionPerSlot      INTEGER (1..14)                                                     OPTIONAL, -- Need S
    nrofSRSRepitionSlots        ENUMERATED {n2,n4,n8}                                               OPTIONAL, -- Need S
}
<unchanged part omitted>
}
```

FIG. 9C

```
SRS-Resource ::=        SEQUENCE {
    srs-ResourceId          SRS-ResourceId,
    nrofSRS-Ports           ENUMERATED {port1, ports2, ports4},
    ptrs-PortIndex          ENUMERATED {n0, n1}                         OPTIONAL, -- Need R
    transmissionComb        CHOICE {
        n2                      SEQUENCE {
                                    combOffset-n2       INTEGER (0..1),
                                    cyclicShift-n2      INTEGER (0..7)
                                },
        n4                      SEQUENCE {
                                    combOffset-n4       INTEGER (0..3),
                                    cyclicShift-n4      INTEGER (0..11)
                                }
                            },
    resourceMapping         SEQUENCE {
        startPosition           INTEGER (0..5),
        nrofSymbols             ENUMERATED {n1, n2, n4},
        repetitionFactor        ENUMERATED {n1, n2, n4}
        nrofSlots               ENUMERATED {n2,n4,n8}                   OPTIONAL, -- Need S
    },
<unchanged part omitted>
}
```

*FIG. 10A*

```
SRS-Resource ::=         SEQUENCE {
    srs-ResourceId           SRS-ResourceId,
    nrofSRS-Ports            ENUMERATED {port1, ports2, ports4},
    ptrs-PortIndex           ENUMERATED {n0, n1}                         OPTIONAL, -- Need R
    transmissionComb         CHOICE {
        n2                       SEQUENCE {
            combOffset-n2            INTEGER (0..1),
            cyclicShift-n2           INTEGER (0..7)
        },
        n4                       SEQUENCE {
            combOffset-n4            INTEGER (0..3),
            cyclicShift-n4           INTEGER (0..11)
        }
    },
    resourceMapping          SEQUENCE {
        startPosition            INTEGER (0..5),
        nrofSymbols              ENUMERATED {n1, n2, n4},
        repetitionFactor         ENUMERATED {n1, n2, n4},
        SRSReptitionSymbolOffset INTEGER (0..12)                         OPTIONAL, -- Need S
        nrofSRSReptitionPerSlot  INTEGER (1..14)                         OPTIONAL, -- Need S
    },
    <unchanged part omitted>
}
```

*FIG. 10B*

```
SRS-Resource ::=        SEQUENCE {
    srs-ResourceId          SRS-ResourceId,
    nrofSRS-Ports           ENUMERATED {port1, ports2, ports4},
    ptrs-PortIndex          ENUMERATED {n0, n1}                         OPTIONAL,  -- Need R
    transmissionComb        CHOICE {
        n2                      SEQUENCE {
            combOffset-n2           INTEGER (0..1),
            cyclicShift-n2          INTEGER (0..7)
        },
        n4                      SEQUENCE {
            combOffset-n4           INTEGER (0..3),
            cyclicShift-n4          INTEGER (0..11)
        }
    },
    resourceMapping         SEQUENCE {
        startPosition           INTEGER (0..5),
        nrofSymbols             ENUMERATED {n1, n2, n4},
        repetitionFactor        ENUMERATED {n1, n2, n4}
        SRSRepetitionSymbolOffset    INTEGER (0..12)                    OPTIONAL,  -- Need S
        nrofSRSRepetitionPerSlot     INTEGER (1..14)                    OPTIONAL,  -- Need S
        nrofSRSRepetitionSlots       ENUMERATED {n2,n4,n8}              OPTIONAL,  -- Need S
    },
    <unchanged part omitted>
}
```

*FIG. 10C*

| R | SRS Resource Set's Cell ID | SRS Resource Set's BWP ID | | |
|---|---|---|---|---|
| R | R | R | SUL | SRS Resource Set ID |
| Number of Slots | | | Number of Slots | |
| ... | | | | |
| Number of Slots | | | R | |

FIG. 11

SRS COVERAGE ENHANCEMENT

PRIORITY CLAIM INFORMATION

This application is a national stage application of International Application No. PCT/CN2020/120306, filed on Oct. 12, 2020, titled "SRS Coverage Enhancement", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for sounding reference signal (SRS) coverage enhancement for enhanced multiple-input-multiple-output (MIMO) operation.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for sounding reference signal (SRS) coverage enhancement for enhanced multiple-input-multiple-output (MIMO) operation.

For example, in some embodiments, a user equipment device (UE), such as UE 106, may be configured to receive, from a base station, such as base station 102, a configuration for SRS time domain bundling. In addition, the UE may be configured to transmit, to the base station, at least one SRS transmission in accordance with the configuration for SRS time domain bundling. In other words, the UE may transmit an SRS in one or more SRS transmission occasions based on the configuration for SRS time domain bundling. The configuration may include an indication of (and/or indicate) one or more SRS transmission occasions. Note that SRS transmission occasions may correspond to a slot for inter-slot bundling; however, a slot may include one or more SRS transmission occasions for intra-slot bundling and/or hybrid inter-slot/intra-slot bundling. Additionally, the configuration may be communicated via higher layer signaling, such as via a radio resource control (RRC) parameter and/or a medium access control (MAC) control element (CE) and/or via physical layer signaling such as downlink control information (DCI). In some embodiments, the RRC parameter may be one of an SRS-ResourceSet parameter or an SRS-Resource parameter. Further, the RRC parameter may include a nrofSlots parameter to indicate the number of slots. In some embodiments, the MAC CE may include at least four bits (and/or four or more bits) indicating the number of slots. Additionally, the DCI may include at least one field indicating the number of slots.

As another example, in some embodiments, a base station, such as base station 102, may be configured to may transmit (and/or send), to a UE, such as UE 106, a configuration for SRS time domain bundling. In addition, the base station may be configured to receive, from the UE, at least one SRS transmission in accordance with the configuration for SRS time domain bundling. In other words, the base station may receive an SRS in one or more SRS transmission occasions based on the configuration for SRS time domain bundling. The configuration may include an indication of (and/or indicate) one or more SRS transmission occasions. Note that SRS transmission occasions may correspond to a slot for inter-slot bundling; however, a slot may include one or more SRS transmission occasions for intra-slot bundling and/or hybrid inter-slot/intra-slot bundling. Additionally, the configuration may be communicated via higher layer signaling, such as via a radio resource control (RRC) parameter and/or a medium access control (MAC) control element (CE) and/or via physical layer signaling such as downlink control information (DCI). In some embodiments, the RRC parameter may be one of an SRS-ResourceSet parameter or an SRS-Resource parameter. Further, the RRC parameter may include a nrofSlots parameter to indicate the number of slots. In some embodiments, the MAC CE may include at least four bits (and/or four or more bits) indicating the number of slots. Additionally, DCI may include at least one field indicating the number of slots.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 6A-6C, 7A-7C, and 8A-8C illustrate various time domain bundling configurations for SRS coverage enhancement, according to some embodiments.

FIGS. 9A-9C and 10A-10C illustrate examples of RRC parameters for SRS time domain bundling, according to some embodiments.

FIG. 11 illustrates an example of a MAC CE for SRS time domain bundling, according to some embodiments.

Figure 1A:
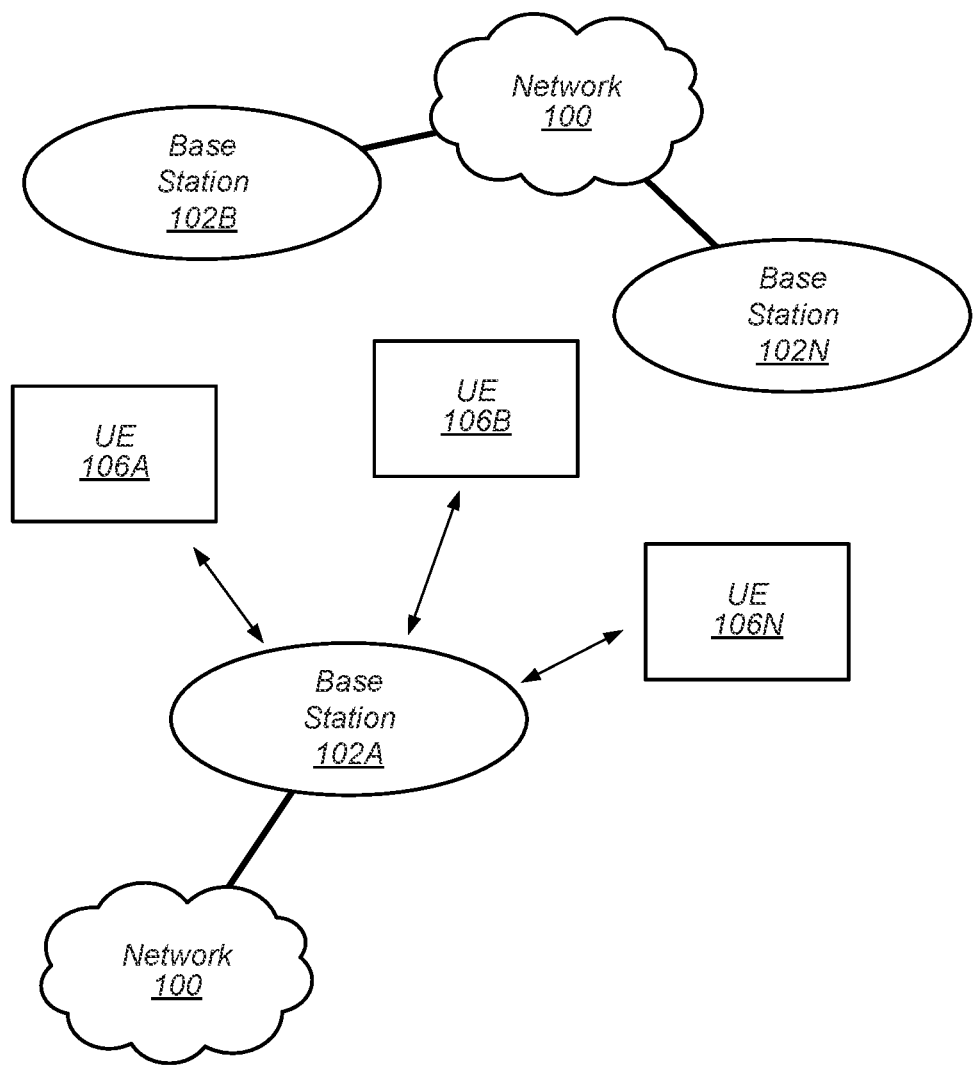
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
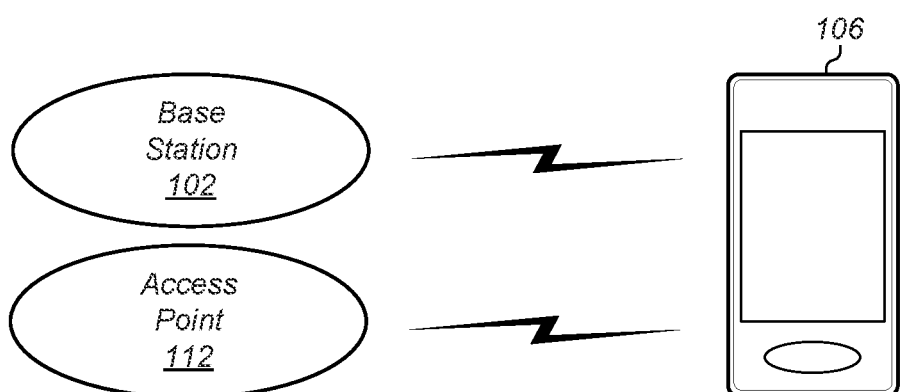
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
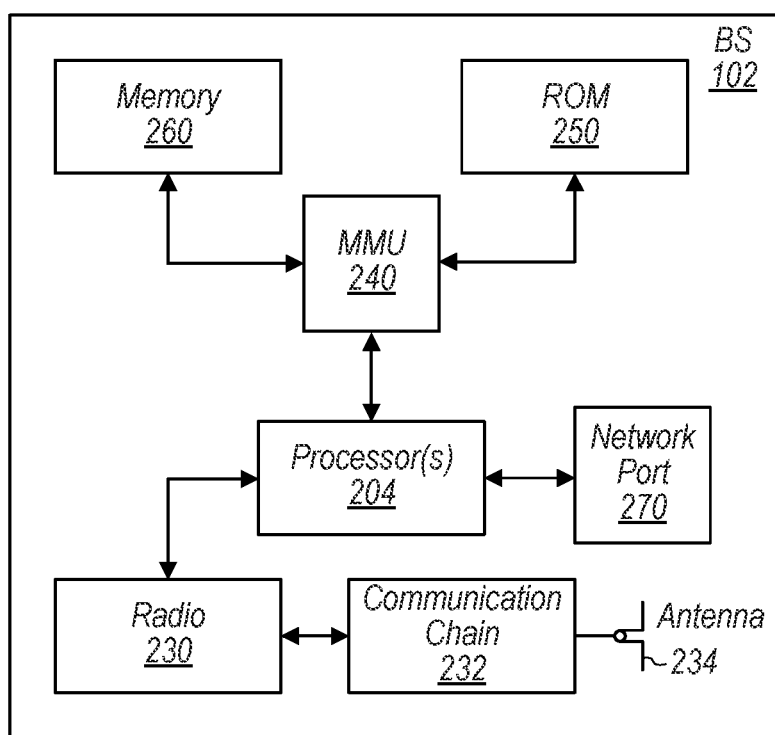
FIG. 2 illustrates an example block diagram of a BS according to some embodiments.

FIG. 2: Block Diagram of a Base Station

FIG. 2 illustrates an example block diagram of a base station 102, according to some embodiments. It is noted that the base station of FIG. 2 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

Figure 3:
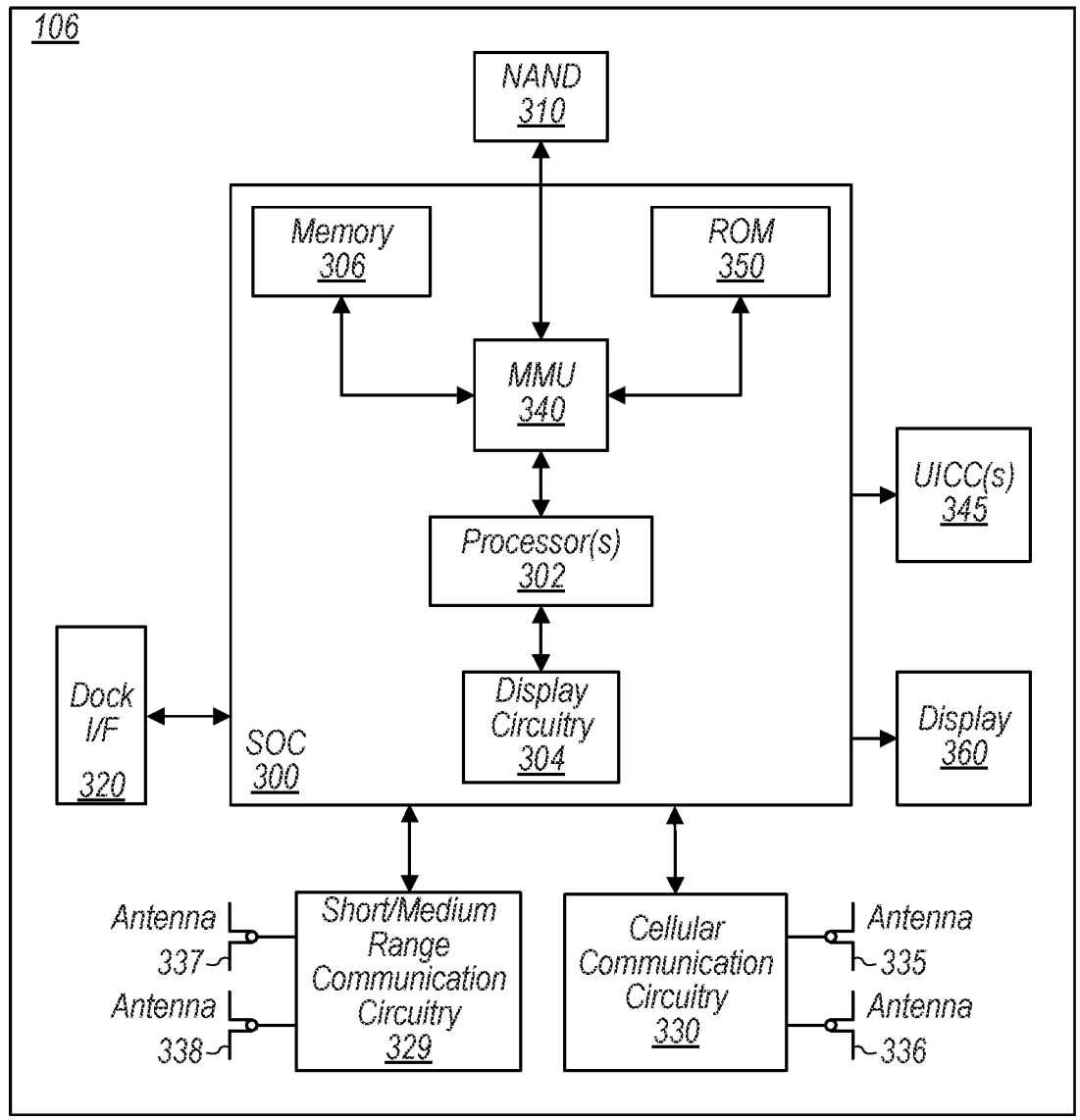
FIG. 3 illustrates an example block diagram of a UE according to some embodiments.

FIG. 3: Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 345 may be implemented as a removable smart card. Thus, the SIM(s) may be one or more removable smart cards (such as UICC cards, which are sometimes referred to as "SIM cards"), and/or the SIMs 345 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 345 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for sounding reference signal (SRS) coverage enhancement for enhanced multiple-input-multiple-output (MIMO) operation, as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
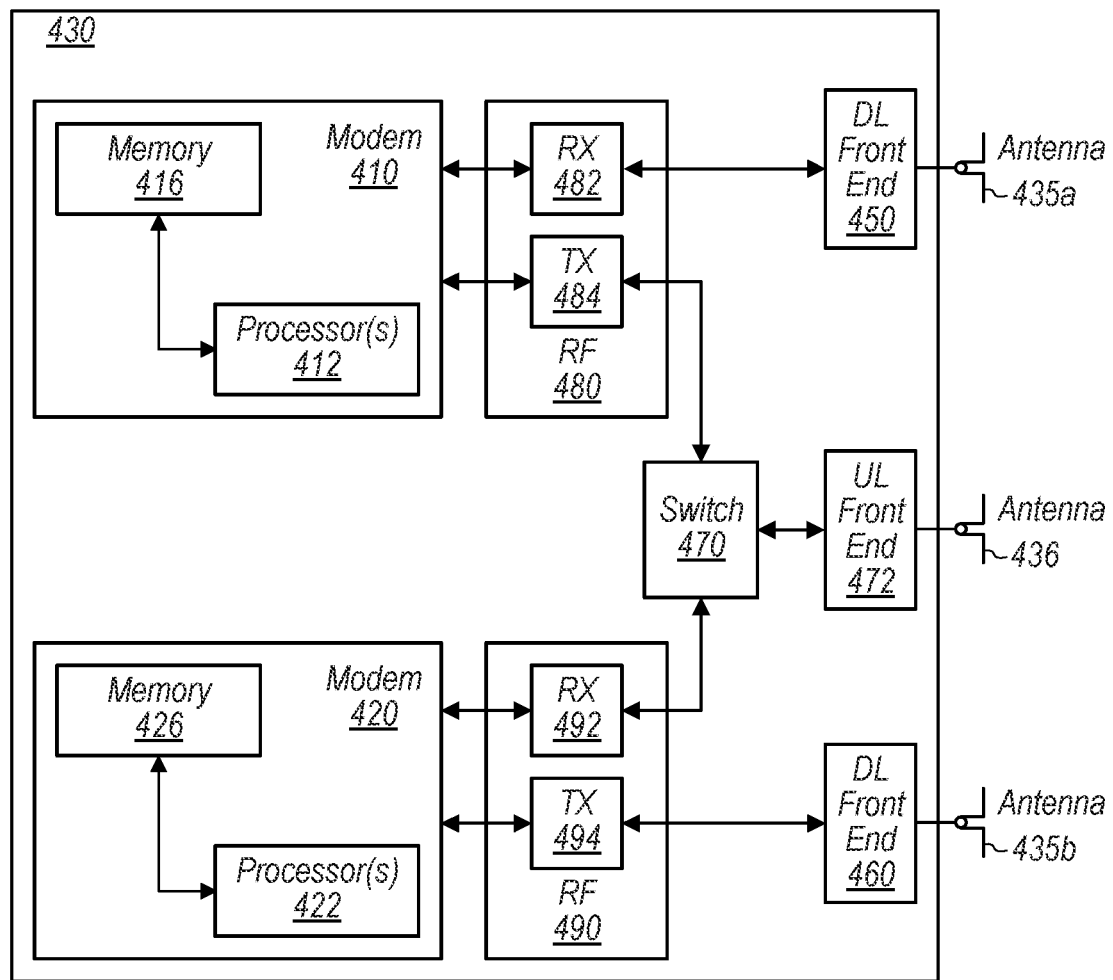
FIG. 4 illustrates an example block diagram of cellular communication circuitry, according to some embodiments.

FIG. 4: Block Diagram of Cellular Communication Circuitry

FIG. 4 illustrates an example simplified block diagram of cellular communication circuitry, according to some embodiments. It is noted that the block diagram of the cellular communication circuitry of FIG. 4 is only one example of a possible cellular communication circuit. According to embodiments, cellular communication circuitry 430, which may be an example of cellular communication circuitry 330, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 430 may couple (e.g., communicatively; directly or indirectly) to one or more antennas, such as antennas 435a-b and 436 as shown (in FIG. 4). In some embodiments, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 4, cellular communication circuitry 430 may include a modem 410 and a modem 420. Modem 410 may be configured for communications according to a first RAT, e.g., such as LTE or LTE-A, and modem 420 may be configured for communications according to a second RAT, e.g., such as 5G NR.

As shown, modem 410 may include one or more processors 412 and a memory 416 in communication with processors 412. Modem 410 may be in communication with a radio frequency (RF) front end 480. RF front end 480 may include circuitry for transmitting and receiving radio signals. For example, RF front end 480 may include receive circuitry (RX) 482 and transmit circuitry (TX) 484. In some embodiments, receive circuitry 482 may be in communication with downlink (DL) front end 450, which may include circuitry for receiving radio signals via antenna 435a.

Similarly, modem 420 may include one or more processors 422 and a memory 426 in communication with processors 422. Modem 420 may be in communication with an RF front end 490. RF front end 490 may include circuitry for transmitting and receiving radio signals. For example, RF front end 490 may include receive circuitry 492 and transmit circuitry 494. In some embodiments, receive circuitry 492 may be in communication with DL front end 460, which may include circuitry for receiving radio signals via antenna 435b.

In some embodiments, a switch 470 may couple transmit circuitry 494 to uplink (UL) front end 472. In addition, switch 470 may couple transmit circuitry 494 to UL front end 472. UL front end 472 may include circuitry for transmitting radio signals via antenna 436. Thus, when cellular communication circuitry 430 receives instructions to transmit according to the first RAT (e.g., as supported via modem 410), switch 470 may be switched to a first state that allows modem 410 to transmit signals according to the first RAT (e.g., via a transmit chain that includes transmit circuitry 484 and UL front end 472). Similarly, when cellular communication circuitry 430 receives instructions to transmit according to the second RAT (e.g., as supported via modem 420), switch 470 may be switched to a second state that allows modem 420 to transmit signals according to the second RAT (e.g., via a transmit chain that includes transmit circuitry 494 and UL front end 472).

In some embodiments, the cellular communication circuitry 430 may be configured to perform methods for sounding reference signal (SRS) coverage enhancement for enhanced multiple-input-multiple-output (MIMO) operation, as further described herein.

As described herein, the modem 410 may include hardware and software components for implementing the above features or for time division multiplexing UL data for NSA NR operations, as well as the various other techniques described herein. The processors 412 may be configured to implement part or all of the features described herein, e.g., by executing program instructions stored on a memory medium (e.g., a non-transitory computer-readable memory medium). Alternatively (or in addition), processor 412 may be configured as a programmable hardware element, such as an FPGA (Field Programmable Gate Array), or as an ASIC (Application Specific Integrated Circuit). Alternatively (or in addition) the processor 412, in conjunction with one or more of the other components 430, 432, 434, 450, 470, 472, 435 and 436 may be configured to implement part or all of the features described herein.

In addition, as described herein, processors 412 may include one or more processing elements. Thus, processors 412 may include one or more integrated circuits (ICs) that are configured to perform the functions of processors 412. In addition, each integrated circuit may include circuitry (e.g., first circuitry, second circuitry, etc.) configured to perform the functions of processors 412.

As described herein, the modem 420 may include hardware and software components for implementing the above features for communicating a scheduling profile for power savings to a network, as well as the various other techniques described herein. The processors 422 may be configured to implement part or all of the features described herein, e.g., by executing program instructions stored on a memory medium (e.g., a non-transitory computer-readable memory medium). Alternatively (or in addition), processor 422 may be configured as a programmable hardware element, such as an FPGA (Field Programmable Gate Array), or as an ASIC (Application Specific Integrated Circuit). Alternatively (or in addition) the processor 422, in conjunction with one or more of the other components 440, 442, 444, 450, 470, 472, 435 and 436 may be configured to implement part or all of the features described herein.

In addition, as described herein, processors 422 may include one or more processing elements. Thus, processors 422 may include one or more integrated circuits (ICs) that are configured to perform the functions of processors 422. In addition, each integrated circuit may include circuitry (e.g., first circuitry, second circuitry, etc.) configured to perform the functions of processors 422.

Figure 5:
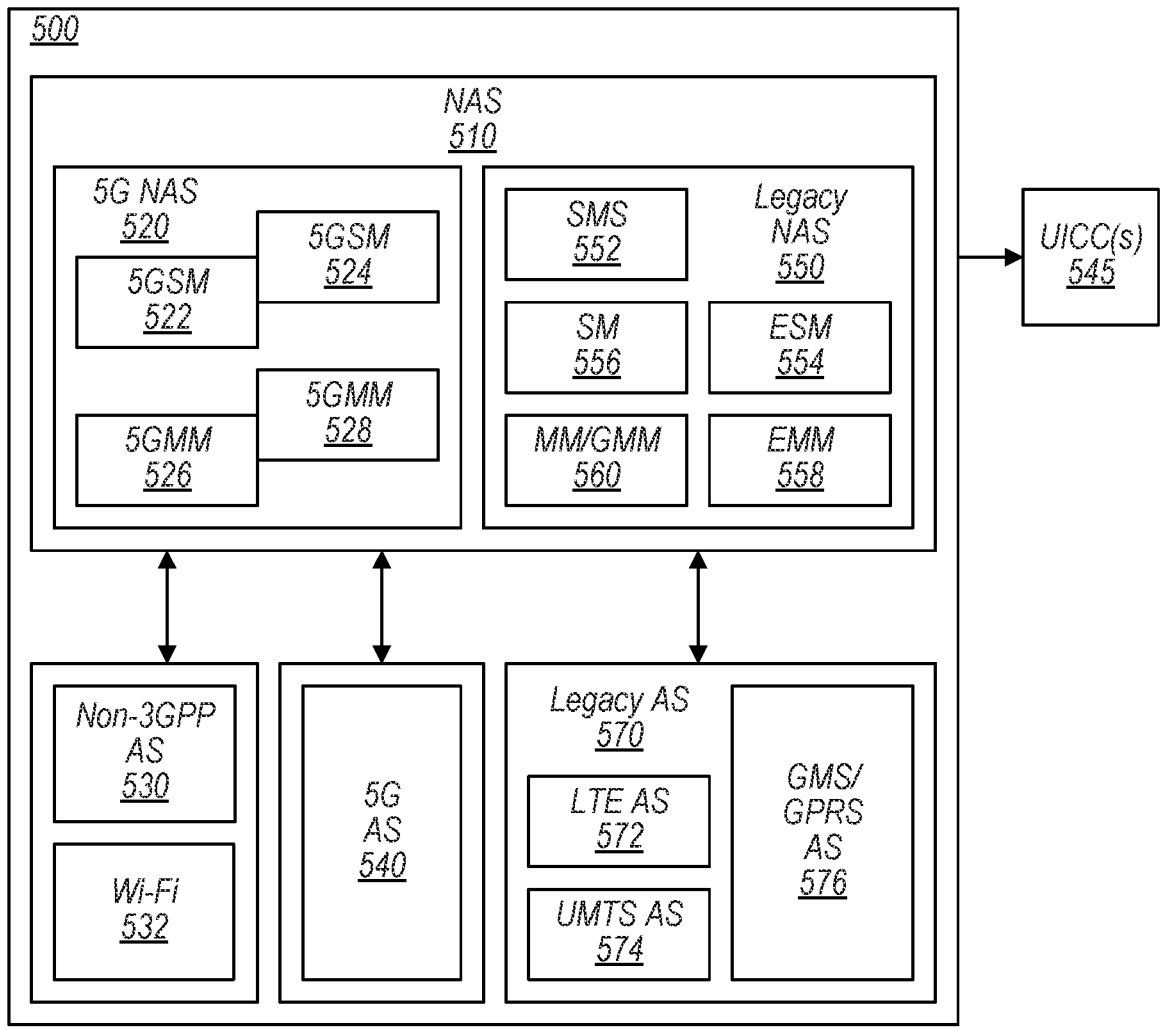
FIG. 5 illustrates an example of a baseband processor architecture for a UE, according to some embodiments.

FIG. 5: Block Diagram of a Baseband Processor

FIG. 5 illustrates an example of a baseband processor architecture for a UE (e.g., such as UE 106), according to some embodiments. The baseband processor architecture 500 described in FIG. 5 may be implemented on one or more radios (e.g., radios 329, 330 and/or 430 described above) or modems (e.g., modems 410 and/or 420) as described above. As shown, the non-access stratum (NAS) 510 may include a 5G NAS 520 and a legacy NAS 550. The legacy NAS 550 may include a communication connection with a legacy access stratum (AS) 570. The 5G NAS 520 may include communication connections with both a 5G AS 540 and a non-3GPP AS 530 and Wi-Fi AS 532. The 5G NAS 520 may include functional entities associated with both access stratums. Thus, the 5G NAS 520 may include multiple 5G MM entities 526 and 528 and 5G session management (SM) entities 522 and 524. The legacy NAS 550 may include functional entities such as short message service (SMS) entity 552, evolved packet system (EPS) session management (ESM) entity 554, session management (SM) entity 556, EPS mobility management (EMM) entity 558, and mobility management (MM)/GPRS mobility management (GMM) entity 560. In addition, the legacy AS 570 may include functional entities such as LTE AS 572, UMTS AS 574, and/or GSM/GPRS AS 576.

Thus, the baseband processor architecture 500 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods such as sounding reference signal (SRS) coverage enhancement for enhanced multiple-input-multiple-output (MIMO) operation, e.g., as further described herein.

SRS Coverage Enhancement

In current cellular communication systems, a user equipment device (UE) may periodically transmit a sounding reference signal (SRS) to a base station on an uplink channel. The SRS signal may be used by the base station to assess the uplink channel quality between the UE and the base station. More particularly, the base station often allocates only a portion of the full system bandwidth to a specific UE at any given time, thus, the base station may use the received SRS signal to determine which portion of the overall system bandwidth has the best relative uplink channel quality, e.g., for communications with the specific UE. In other words, the base station may use the received SRS signals from various UEs to allocate a "best" frequency region to each of the UEs, based on the uplink channel quality determined from the SRS signals.

In addition, in current cellular communication systems, a UE may be configured to transmit an SRS signal at predefined intervals, e.g., according to a set period. However, the base station can also make a specific aperiodic request for the UE to transmit an SRS signal. The base station's request for an aperiodic SRS may take the form of an SRS trigger that is transmitted from the base station to the UE. The base station may decide to send an aperiodic SRS trigger to the UE based on a detection of degradation in uplink channel quality as well as for other reasons.

In current implementations, the base station can perform aperiodic SRS (AP-SRS) triggering in various DCI formats, including uplink (UL) DCI formats 0_1 and 0_2, downlink (DL) DCI formats 1_1 and 1_2, and DCI format 2_3.

Further, in current implementations, such as 3GPP Release 15, a sound reference signal (SRS) can only be transmitted in the last six symbols of each slot. In 3GPP Release 16, an SRS can be transmitted in any symbol for Fifth Generation (5G) New Radio (NR) positioning and NR in unlicensed spectrum (NR-U) or NR positioning. In addition, an SRS can be repeated for up to four symbols. Further, simple repetition of the SRS without any cover code is supported.

Additionally, in current implementations of 5G NR, there are two types of reference signals (demodulation reference signal (DMRS) and SRS) that a UE may transmit to a base station (e.g., in the uplink) to indicate information about channel quality. Further, the base station may base various decisions associated with resource allocation for uplink transmission, link adaptation, and decoding of transmitted data from the UE based on these reference signals. In particular, an SRS is an UL reference signal which provides information about the combined effect of multipath fading, scattering, Doppler and power loss of a transmitted signal from the UE. Thus, a base station may estimate channel quality using an SRS and manage further resource scheduling, beam management, and power control of a signal based on the SRS. Hence, an SRS may provide information to the base station about the channel over a full bandwidth and, based on this information, the base station may make determinations for resource allocation, e.g., such as determining which bandwidth has better channel quality comparing to other bandwidth regions.

Embodiments described herein provide systems, methods, and mechanisms for SRS coverage enhancements. For example, in some embodiments, a UE may implement and/or use time domain bundling to improve SRS coverage. The UE may repeat an SRS transmission multiple times, e.g., in multiple slots (inter-slot bundling, which may be continuous or non-contiguous), within a slot (intra-slot bundling), and/or a combination thereof. A base station may perform averaging across the multiple SRS transmissions, e.g., to improve reliability of channel quality measurements based on the SRS. In some embodiments, a number of SRS transmissions to bundle (and/or a number of slots to repeat the SRS) may be configured via signaling between the UE and base station. For example, the signaling between the UE and base station may be higher layer signaling and a number of SRS transmission to bundle (and/or a number of slots to repeat the SRS) may be indicated via radio resource control (RRC) signaling, and/or via a medium access control (MAC) control element (CE). As another example, the signaling between the UE and base station may be physical layer signaling and a number of SRS transmission to bundle (and/or a number of slots to repeat the SRS) may be indicated via downlink control information (DCI). In some embodiments, the SRS transmissions may be in slots that may be consecutive and/or contiguous slots. In other words, the UE may transmit SRS in consecutive slots up to the number of SRS transmissions configured to be bundled by the base station. In some embodiments, the SRS transmissions may be in slots that may be non-consecutive and/or non-contiguous slots. In other words, the UE may transmit SRS in non-consecutive slots up to a number of SRS transmissions configured to be bundled by the base station. For example, the UE may be configured, by the base station, to transmit a bundled SRS in every second slot (e.g., skipping one slot between SRS transmissions), every third slot (e.g., skipping two slots between SRS transmissions), every fourth slot (e.g., skipping three slots between SRS transmissions), and so forth. In some embodiments, the SRS transmissions may be within a slot. In other words, the UE may transmit SRS multiple times within a slot up to the number of transmissions configured to be bundled by the base station. Note that intra-slot bundling of SRS transmission may occur in a single slot and/or across multiple slots that may be contiguous and/or non-contiguous.

For example, FIGS. 6A-6C, 7A-7C, and 8A-8C illustrate various time domain bundling configurations for SRS coverage enhancement, according to some embodiments. As an example, in some embodiments, e.g., as shown in FIG. 6A, a base station (e.g., base station 102), via higher layer signaling and/or physical layer signaling as further described herein, may configure a UE (e.g., UE 106), to transmit SRS 610a-c in slots n, n+1, and n+2. In other words, the base station may configure the UE to bundle SRS transmissions across three slots. As another example, in some embodiments, e.g., as shown in FIG. 6B, a base station (e.g., base station 102), via higher layer signaling and/or physical layer signaling as further described herein, may configure a UE (e.g., UE 106), to transmit SRS 620a-d in slots n, n+1, n+2, and n+3. In other words, the base station may configure the UE to bundle SRS transmissions across four slots. As a further example, in some embodiments, e.g., as shown in FIG. 6C, a base station (e.g., base station 102), via higher layer signaling and/or physical layer signaling as further described herein, may configure a UE (e.g., UE 106), to transmit SRS 630a-e in slots n, n+1, n+2, n+3, and n+4. In other words, the base station may configure the UE to bundle SRS transmissions across five slots. Note that in some embodiments, a number of SRS transmissions and/or a number of slots configured for bundled SRS transmissions may be dependent on network conditions, such as channel quality, network traffic, UE mobility, and so forth.

Figure 7A:
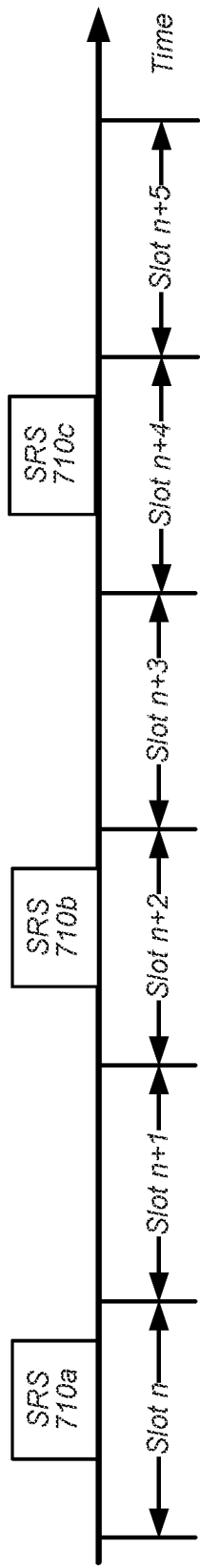
Figure 7B:
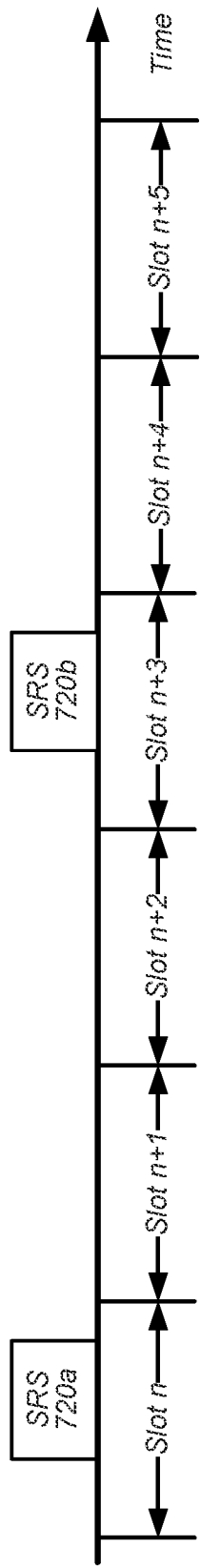
Figure 7C:
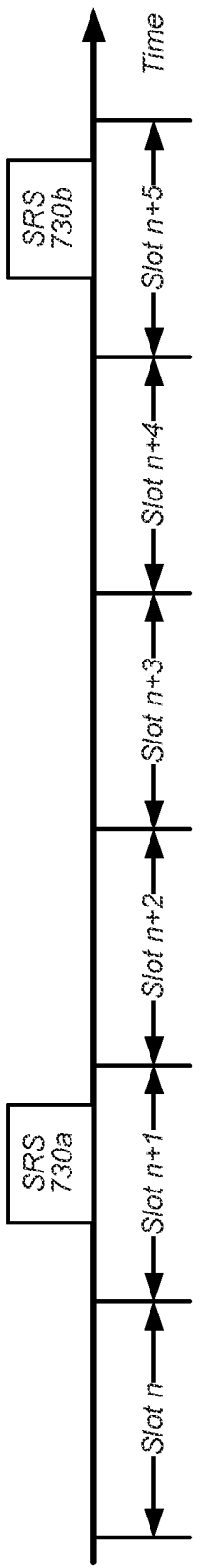

As a further example, in some embodiments, e.g., as shown in FIG. 7A, a base station (e.g., base station 102), via higher layer signaling and/or physical layer signaling as further described herein, may configure a UE (e.g., UE 106), to transmit SRS 710a-c in slots n, n+2, and n+4. In other words, the base station may configure the UE to bundle SRS transmissions across alternating slots (e.g., every other slot and/or every second slot). As another example, in some embodiments, e.g., as shown in FIG. 7B, a base station (e.g., base station 102), via higher layer signaling and/or physical layer signaling as further described herein, may configure a UE (e.g., UE 106), to transmit SRS 720a-b in slots n and n+3. In other words, the base station may configure the UE to bundle SRS transmissions across every third slot. As a further example, in some embodiments, e.g., as shown in FIG. 7C, a base station (e.g., base station 102), via higher layer signaling and/or physical layer signaling as further described herein, may configure a UE (e.g., UE 106), to transmit SRS 730a-b in slots n+1 and n+5. In other words, the base station may configure the UE to bundle SRS transmissions across every fourth slot. Note that in some embodiments, a number of SRS transmissions and/or a number of slots configured for bundled SRS transmissions may be dependent on network conditions, such as channel quality, network traffic, UE mobility, and so forth.

As a yet further example, in some embodiments, e.g., as shown in FIG. 8A, a base station (e.g., base station 102), via higher layer signaling and/or physical layer signaling as further described herein, may configure a UE (e.g., UE 106), to transmit SRS 810a-d in slot n. In other words, the base station may configure the UE to bundle SRS transmissions in a single slot (e.g., intra-slot bundling). As another example, in some embodiments, e.g., as shown in FIG. 8B, a base station (e.g., base station 102), via higher layer signaling and/or physical layer signaling as further described herein, may configure a UE (e.g., UE 106), to transmit SRS 820a-b in slot n and SRS 820c-d in slot n+1. In other words, the base station may configure the UE to bundle SRS transmissions intra-slot and inter-slot across contiguous slots. As a further example, in some embodiments, e.g., as shown in FIG. 8C, a base station (e.g., base station 102), via higher layer signaling and/or physical layer signaling as further described herein, may configure a UE (e.g., UE 106), to transmit SRS 830a-b in slot n and SRS 830c-d in slot n+2. In other words, the base station may configure the UE to bundle SRS transmissions intra-slot and inter-slot across non-contiguous slots. Note that in some embodiments, a number of SRS transmissions and/or a number of slots configured for bundled SRS transmissions may be dependent on network conditions, such as channel quality, network traffic, UE mobility, and so forth.

As noted above, in some embodiments, a base station, such as base station 102, and a UE, such as UE 106, may exchange higher layer signaling to configure SRS time domain bundling. For example, in some embodiments, the base station may configure the UE for SRS time domain bundling via a radio resource control (RRC) parameter, e.g., such as an SRS-ResourceSet parameter as illustrated in FIGS. 9A, 9B, and 9C and/or an SRS-Resource parameter as illustrated in FIGS. 10A, 10B, and 10C.

As shown in FIG. 9A, an SRS-ResourceSet parameter may include a parameter indicating a number of slots to transmit a time domain bundled SRS. For example, the parameter may be a nrofSlots parameter that may have an enumerated value of [n2, n4, n8] and/or [n12, n16, n32], among other values. The nrofSlots parameter may indicate a number of slots to repeat an SRS transmission and/or a number of SRS transmissions to be bundled. As shown in FIG. 9B, an SRS-ResourceSet parameter may include one or more parameters indicating a number of transmissions per slot to transmit a time domain bundled SRS. For example, the one or more parameters may include an SRSRepetitionSymbolOffset parameter and a nrofSRSRepetitionPerSlot parameter. The SRSRepetitionSymbolOffset parameter may indicate a number of symbols between SRS transmissions bundled within a slot, e.g., for intra-slot SRS bundling. Additionally, the nrofSRSReptitionPerSlot parameter may indicate a number of SRS transmissions per slot. As shown in FIG. 9C, an SRS-ResourceSet parameter may include one or more parameters indicating a number transmissions per slot and a number of slots to repeat an SRS transmission. For example, the one or more parameters may include an SRS-RepetitionSymbolOffset parameter and nrofSRSRepetitionPerSlot parameter, and a nrofSRSRepetitionSlots. The SRS-RepetitionSymbolOffset parameter may indicate a number of symbols between SRS transmissions bundled within a slot, e.g., for intra-slot SRS bundling. Additionally, the nrofSRSReptitionPerSlot parameter may indicate a number of SRS transmissions per slot. Further, the nrofSRSRepetitionSlots parameter may indicate a number of slots to repeat the intra-slot bundled SRS transmissions as indicated by the SRSRepetitionSymbolOffset parameter and the nrofSRS-RepetitionPerSlot parameters.

As shown in FIG. 10A, an SRS-Resource parameter may include a parameter indicating a number of slots to transmit a time domain bundled SRS. For example, the parameter may be a nrofSlots parameter that may have an enumerated value of [n2, n4, n8] and/or [n12, n16, n32], among other values. The nrofSlots parameter may indicate a number of slots to repeat an SRS transmission and/or a number of SRS transmissions to be bundled. As shown in FIG. 10B, an SRS-Resource parameter may include one or more parameters indicating a number of transmissions per slot to transmit a time domain bundled SRS. For example, the one or more parameters may include an SRSRepetitionSymbolOffset parameter and a nrofSRSRepetitionPerSlot parameter. The SRSRepetitionSymbolOffset parameter may indicate a number of symbols between SRS transmissions bundled within a slot, e.g., for intra-slot SRS bundling. Additionally, the nrofSRSReptitionPerSlot parameter may indicate a number of SRS transmissions per slot. As shown in FIG. 10C, an SRS-Resource parameter may include one or more parameters indicating a number transmissions per slot and a number of slots to repeat an SRS transmission. For example, the one or more parameters may include an SRSRepetition-SymbolOffset parameter and nrofSRSRepetitionPerSlot parameter, and a nrofSRSRepetitionSlots. The SRSRepetitionSymbolOffset parameter may indicate a number of symbols between SRS transmissions bundled within a slot, e.g., for intra-slot SRS bundling. Additionally, the nrofSRSReptitionPerSlot parameter may indicate a number of SRS transmissions per slot. Further, the nrofSRSRepetitionSlots parameter may indicate a number of slots to repeat the intra-slot bundled SRS transmissions as indicated by the SRSRepetitionSymbolOffset parameter and the nrofSRS-RepetitionPerSlot parameters.

As another example, in some embodiments, the base station may configure the UE for SRS time domain bundling via a medium access control (MAC) control element (CE), e.g., such as the MAC CE illustrated in FIG. 11. As shown, such a MAC CE may include an SRS Resource Set's Cell ID parameter, an SRS Resource Set's BWP ID parameter, an SUL parameter, an SRS Resource Set ID parameter, a Number of Slots parameter, and/or one or more reserved bits (R). In some embodiments, the SRS Resource Set's Cell ID parameter may indicate a cell identifier (ID) containing an SRS resource set. In some embodiments, the SRS Resource Set's Cell ID parameter may include 5 bits. In some embodiments, the SRS Resource Set's BWP ID may indicate a bandwidth part (BWP) ID containing the SRS resource set. In some embodiments, the SRS Resource Set's BWP ID may include 2 bits. In some embodiments, the SUL parameter may indicate either normal uplink (UL) or supplemental UL. In some embodiments, the SUL parameter may include 1 bit. In some embodiments, the SRS Resource Set ID parameter may indicate the SRS resource set. In some embodiments, the SRS Resource Set ID parameter may include 4 bits. In some embodiments, the Number of Slots parameter may indicate a bundling level configuration (e.g., number of aggregated slots) for each SRS resource in indicated SRS resource set. In some embodiments, the bundling level configuration for each SRS resource may be indicated in an order of SRS resource within the SRS resource set. In some embodiments, the Number of Slots parameter may include four bits per SRS resources and the total number of bits for the Number of Slots may depend on the number of SRS resources configured in a corresponding SRS resource set subject to octet alignment. Note that in some embodiments, such a MAC CE may be extended to include parameters associated with intra-slot bundling. For example, the MAC CE may include a parameter indicating a number transmissions per slot and a number of slots to repeat an SRS transmission as well as a parameter indicating symbol spacing for intra-slot transmissions.

As a further example, in some embodiments, the base station may configure the UE for SRS time domain bundling via downlink control information (DCI). For example, for inter-slot SRS time domain bundling, a current DCI format may be modified to include a field indicating a number of slots for SRS repetition, e.g., such as an SRS inter-slot repetition number field. The field indicating the number of slots for SRS repletion may have a value ranging from 2 to 32 or greater, at least in some embodiments. As another example, for intra-slot SRS time domain bundling, a current DCI format may be modified to include fields indicating a number of intra-slot SRS repetitions, e.g., such as an SRS intra-slot repetition number field, and/or a number of symbols between SRS repetitions, e.g., such as an SRS intra-slot repetition symbol offset field. As a further example, for a hybrid inter-slot/intra-slot SRS time domain bundling, a current DCI format may be modified to include fields indicating a number of slots for SRS repetition, e.g., such as an SRS inter-slot repetition number field, a number of intra-slot SRS repetitions, e.g., such as an SRS intra-slot repetition number field, and/or a number of symbols between SRS repetitions, e.g., such as an SRS intra-slot repetition symbol offset field.

Further, embodiments described herein may define UE and/or base station behavior when, during time domain bundling of SRS transmissions, one or more SRS transmission occasions become invalid. For example, in some embodiments, a UE, such as UE 106, may skip and/or omit an SRS transmission occasion. In some embodiments, a UE, such as UE 106, may indicate, e.g., to a base station, such as base station 102, which SRS transmission occasions were omitted and/or skipped. In some embodiments, a base station, such as base station 102, may deduce which SRS transmission occasions may have been omitted and/or skipped based on downlink transmission occasions to a UE, such as UE 106, that may occur during the SRS transmission occasion. As another example, in some embodiments, a UE, such as UE 106, may delay and/or extend an SRS transmission occasion to a next valid slot or slots. Note that in some embodiments, an SRS transmission occasion may become invalid due to:

(i) a dynamic slot format indication (SFI) or a DCI format 2_0 configuring a downlink symbol that collides with an SRS;

(ii) a dynamic grant scheduling a dynamic channel state indicator (CSI) reference signal (RS) or a physical downlink shared channel (PDSCH) reception that collides with an SRS; and/or (iii) a collision with a semi-statically configured downlink (DL) symbol.

Figure 12:
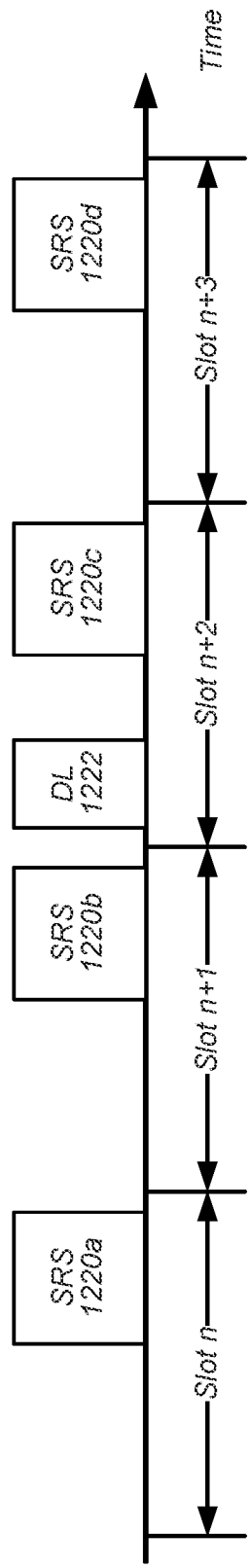
FIG. 12 illustrates an example of UE behavior for SRS time domain bundling during phase continuity loss, according to some embodiments.

Additionally, embodiments described herein may define UE and/or base station behavior when, during time domain bundling of SRS transmissions, a UE loses phase continuity. For example, in some embodiments, when power control leads to different total transmit power in each slot, a UE, such as UE 106, may indicate, e.g., to a base station, such as base station 102, whether the UE can handle SRS time domain bundling phase continuity due to total transmit power change. In some embodiments, such a capability may be indicated for intra-band, intra-component carrier (CC), and/or for certain inter-band frequencies. As another example, in some embodiments, when a UE, such as UE 106, loses phase continuity when duplexing direction changes between two SRS transmission occasions, the UE may indicate, e.g., to a base station, such as base station 102, whether the UE can handle SRS time domain bundling phase continuity due to duplexing direction change. In some embodiments, when a UE, such as UE 106, cannot handle and/or accommodate phase continuity for time domain bundling of SRS transmissions, the UE may drop and/or omit an SRS transmission. For example, as illustrated by FIG. 12, when a UE, such as UE 106, is configured for SRS time domain bundling of SRS transmissions 1220a-d in corresponding slots n, n+1, n+2, and n+3, the UE, when unable to handle a phase continuity change due to DL reception occasion 1222, may drop SRS transmission 1220c-d.

Figure 13:
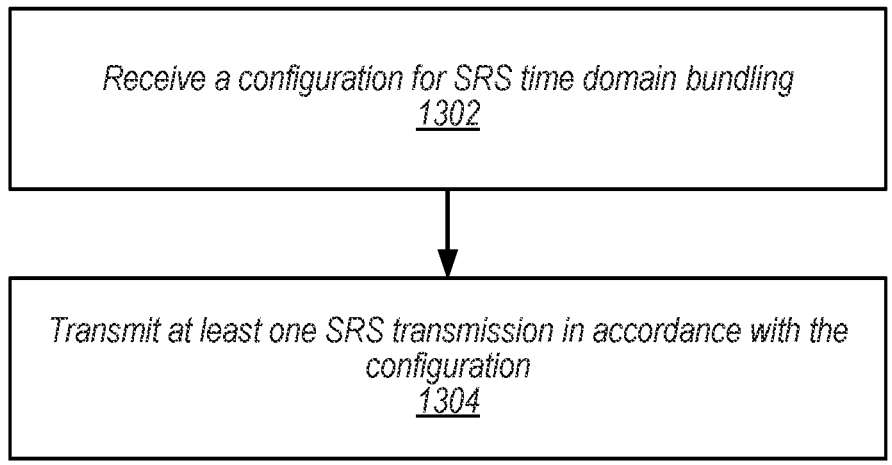
FIGS. 13 and 14 illustrate block diagrams of examples of methods for SRS time domain bundling, according to some embodiments.

FIG. 13 illustrates a block diagram of an example of a method for SRS time domain bundling, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may receive, from a base station, such as base station 102, a configuration for SRS time domain bundling. In some embodiments, the configuration may include a number of SRS transmission occasions. In other words, the configuration may indicate (and/or include an indication of) one or more SRS transmission occasions. In some embodiments, an SRS transmission occasion may correspond to a slot in the time domain, e.g., for inter-slot time domain bundling. In some embodiments, a slot may include one or more SRS transmission occasions, e.g., for intra-slot time domain bundling and/or for hybrid inter-slot/intra-slot time domain bundling. In some embodiments, the configuration may be communicated (e.g., received by the UE/transmitted by the base station) via higher layer signaling and/or physical layer signaling.

In some embodiments, the configuration may be indicated via a radio resource control (RRC) parameter. In some embodiments, the RRC parameter may be one of an SRS-ResourceSet parameter or an SRS-Resource parameter. In some embodiments, the RRC parameter may include a nrofSlots parameter to indicate the number of slots, where an SRS transmission occasion corresponds to a slot. In some embodiments, the RRC parameter may include an SRS-RepetitionSymbolOffset to indicate a number of symbols between SRS transmissions bundled within a slot, e.g., for intra-slot SRS bundling as well as a nrofSRSReptition-PerSlot parameter to indicate a number of SRS transmissions per slot. In some embodiments, the RRC parameter may include an SRSRepetitionSymbolOffset parameter, nrofSRSRepetitionPerSlot parameter, and a nrofSRSRepetitionSlots. The SRSRepetitionSymbolOffset parameter may indicate a number of symbols between SRS transmissions bundled within a slot, e.g., for intra-slot SRS bundling. Additionally, the nrofSRSReptionPerSlot parameter may indicate a number of SRS transmissions per slot. Further, the nrofSRSRepetitionSlots parameter may indicate a number of slots to repeat the intra-slot bundled SRS transmissions as indicated by the SRSRepetitionSymbolOffset parameter and the nrofSRSRepetitionPerSlot parameters.

In some embodiments, the configuration may be indicated via a medium access control (MAC) control element (CE). In some embodiments, the MAC CE may include at least four bits (and/or four or more bits) indicating the number of slots. In some embodiments, the MAC CE may include any, any combination of, and/or all of five bits indicating a cell identifier (ID) containing an SRS resource set, two bits indicating a bandwidth part (BWP) ID containing the SRS resource set, one bit indicating whether normal uplink or supplemental uplink, and/or four bits indicating the SRS resource set. In some embodiments, the MAC CE may also include one or more reserved bits. In some embodiments, the configuration may indicate that slots for SRS transmission occasions are consecutive. In some embodiments, the configuration may indicate that slots for SRS transmission occasions are non-consecutive.

In some embodiments, the configuration may be indicated via DCI. In some embodiments, a DCI (and/or DCI format) may include one or more fields indicating a number of inter-slot repetitions, a number of intra-slot repetitions, and/or a number of symbols between intra-slot repetitions. In other words, the DCI (and/or DCI format) may include at least one field indicating a number of slots, where an SRS transmission occasion corresponds to a slot. In some embodiments, the one or more fields may include an SRS inter-slot repetition number field, e.g., indicating a number of slots for SRS repetition, an SRS intra-slot repetition number field, e.g., indicating a number of intra-slot SRS repetitions, and/or an SRS intra-slot repetition symbol offset field, e.g., indicating a number of symbols between SRS repetitions.

At 1304, the UE may transmit, to the base station, at least one SRS transmission in accordance with the configuration for SRS time domain bundling. In other words, the UE may transmit an SRS in one or more SRS transmission occasions based on the configuration for SRS time domain bundling. For example, the UE may transmit an SRS in one or more slots (consecutive and/or non-consecutive) based on the configuration.

In some embodiments, the UE may determine that an SRS transmission occasion is invalid (e.g., not valid). In such embodiments, the UE may skip and/or omit an SRS transmission associated with the SRS transmission occasion that is invalid. In some embodiments, the UE may indicate, to the base station, the skipped SRS transmission occasion. Additionally, in some embodiments, the UE may transmit, to the base station, the SRS transmission that was skipped in a next available slot. In some embodiments, skipping the SRS transmission may include omitting the SRS transmission. In some embodiments, the UE may determine that the SRS transmission occasion is invalid based, at least in part, on determining that a dynamic slot format indication (SFI) or a DCI format 2_0 configured a downlink (DL) symbol that collides with an SRS transmission, that a dynamic grant scheduling a dynamic channel state indicator (CSI) reference signal (RS) or a physical downlink shared channel (PDSCH) reception collides with an SRS transmission, and/or that an SRS transmission will collide with a semi-statically configured DL symbol.

In some embodiments, the UE may determine a phase discontinuity between consecutive SRS transmissions. In such embodiments, the UE may indicate, to the base station, whether the UE is capable of correcting and/or compensating for the phase discontinuity. In some embodiments, the indication may be on an intra-band, intra-component carrier, and/or inter-band frequencies basis. In some embodiments, the UE may determine, based on the phase discontinuity, that an SRS transmission occasion is invalid. In such embodiments, the UE may skip an SRS transmission associated with the SRS transmission occasion that is invalid. In some embodiments, the phase discontinuity may be due to power control leading to different total transmit power in consecutive slots and/or due to a duplexing direction change between consecutive SRS transmission occasions.

Figure 14:
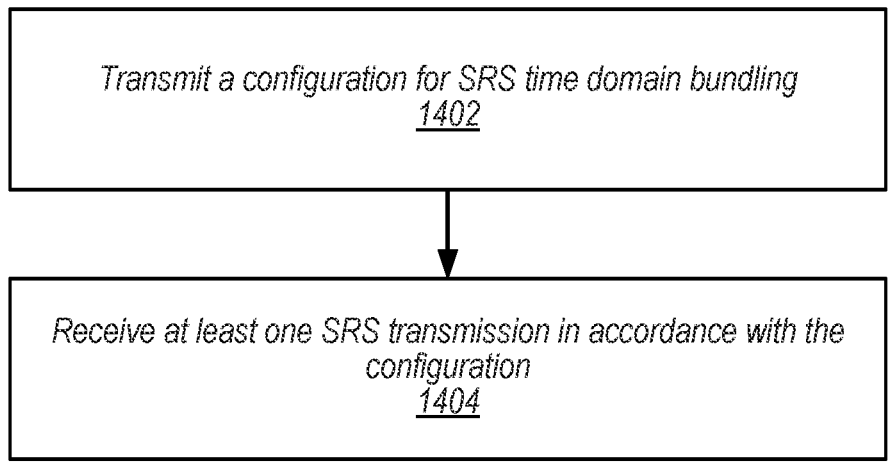

FIG. 14 illustrates a block diagram of an example of a method for SRS time domain bundling, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a base station, such as base station 102, may transmit (and/or send), to a UE, such as UE 106, a configuration for SRS time domain bundling. In some embodiments, the configuration may include a number of SRS transmission occasions. In other words, the configuration may indicate (and/or include an indication of) one or more SRS transmission occasions. In some embodiments, an SRS transmission occasion may correspond to a slot in the time domain, e.g., for inter-slot time domain bundling. In some embodiments, a slot may include one or more SRS transmission occasions, e.g., for intra-slot time domain bundling and/or for hybrid inter-slot/intra-slot time domain bundling. In some embodiments, the configuration may be communicated (e.g., received by the UE/transmitted by the base station) via higher layer signaling and/or physical layer signaling.

In some embodiments, the configuration may be indicated via a radio resource control (RRC) parameter. In some embodiments, the RRC parameter may be one of an SRS-ResourceSet parameter or an SRS-Resource parameter. In some embodiments, the RRC parameter may include a nrofSlots parameter to indicate the number of slots, where an SRS transmission occasion corresponds to a slot. In some embodiments, the RRC parameter may include an SRS-RepetitionSymbolOffset to indicate a number of symbols between SRS transmissions bundled within a slot, e.g., for intra-slot SRS bundling as well as a nrofSRSReptition-PerSlot parameter to indicate a number of SRS transmissions per slot. In some embodiments, the RRC parameter may include an SRSRepetitionSymbolOffset parameter, nrofSRSRepetitionPerSlot parameter, and a nrofSRSRepetitionSlots. The SRSRepetitionSymbolOffset parameter may indicate a number of symbols between SRS transmissions bundled within a slot, e.g., for intra-slot SRS bundling. Additionally, the nrofSRSReptitionPerSlot parameter may indicate a number of SRS transmissions per slot. Further, the nrofSRSRepetitionSlots parameter may indicate a number of slots to repeat the intra-slot bundled SRS transmissions as indicated by the SRSRepetitionSymbolOffset parameter and the nrofSRSRepetitionPerSlot parameters.

In some embodiments, the configuration may be indicated via a medium access control (MAC) control element (CE). In some embodiments, the MAC CE may include at least four bits (and/or four or more bits) indicating the number of slots. In some embodiments, the MAC CE may include any, any combination of, and/or all of five bits indicating a cell identifier (ID) containing an SRS resource set, two bits indicating a bandwidth part (BWP) ID containing the SRS resource set, one bit indicating whether normal uplink or supplemental uplink, and/or four bits indicating the SRS resource set. In some embodiments, the MAC CE may also include one or more reserved bits. In some embodiments, the configuration may indicate that slots for SRS transmission occasions are consecutive. In some embodiments, the configuration may indicate that slots for SRS transmission occasions are non-consecutive.

In some embodiments, the configuration may be indicated via DCI. In some embodiments, a DCI (and/or DCI format) may include one or more fields indicating a number of inter-slot repetitions, a number of intra-slot repetitions, and/or a number of symbols between intra-slot repetitions. In other words, the DCI (and/or DCI format) may include at least one field indicating a number of slots, where an SRS transmission occasion corresponds to a slot. In some embodiments, the one or more fields may include an SRS inter-slot repetition number field, e.g., indicating a number of slots for SRS repetition, an SRS intra-slot repetition number field, e.g., indicating a number of intra-slot SRS repetitions, and/or an SRS intra-slot repetition symbol offset field, e.g., indicating a number of symbols between SRS repetitions.

At 1404, the base station may receive, from the UE, at least one SRS transmission in accordance with the configuration for SRS time domain bundling. In other words, the base station may receive an SRS in one or more SRS transmission occasions based on the configuration for SRS time domain bundling. For example, the base station may receive an SRS in one or more slots (consecutive and/or non-consecutive) based on the configuration. In some embodiments, the base station may add the base station may average the one or more SRS transmissions to enhance estimation of channel conditions between the base station and UE. In other words, the base station may perform averaging across the one or more SRS transmissions to improve reliability of channel quality measurements based on the SRS.

In some embodiments, the UE may determine that an SRS transmission occasion is invalid (e.g., not valid). In such embodiments, the UE may skip and/or omit an SRS transmission associated with the SRS transmission occasion that is invalid. In some embodiments, the UE may indicate, to the base station, the skipped SRS transmission occasion. Additionally, in some embodiments, the base station may receive, from the UE, the SRS transmission that was skipped in a next available slot. In some embodiments, skipping the SRS transmission may include omitting the SRS transmission. In some embodiments, the SRS transmission occasion may be skipped based, at least in part, on a dynamic slot format indication (SFI) or a DCI format 2_0 configuring a downlink (DL) symbol that collides with an SRS transmission, a dynamic grant scheduling a dynamic channel state indicator (CSI) reference signal (RS) or a physical downlink shared channel (PDSCH) reception collides with an SRS transmission, and/or an SRS transmission colliding with a semi-statically configured DL symbol.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
a radio operably coupled to the at least one antenna; and
a processor operably coupled to the radio;
wherein the processor is configured to cause the UE to:
receive, from a base station, a configuration for sounding reference signal (SRS) time domain bundling, wherein the configuration indicates one or more SRS transmission occasions and includes an indication of a number of slots, wherein an SRS transmission occasion corresponds to a slot; and
transmitting, in accordance with the configuration for SRS time domain bundling, at least one SRS transmission during a corresponding SRS transmission occasion.

2. The UE of claim 1,
wherein the configuration is received from the base station via higher layer signaling, and wherein the higher layer signaling includes at least one of a radio resource control (RRC) parameter or a medium access control (MAC) control element (CE).

3. The UE of claim 1,
wherein the configuration is indicated via a radio resource control (RRC) parameter, wherein the RRC parameter is one of an SRS-ResourceSet parameter or an SRS-Resource parameter, wherein the RRC parameter includes a nrofSlots parameter indicating the number of slots.

4. The UE of claim 1,
wherein the configuration is indicated via a medium access control (MAC) control element (CE), wherein the MAC CE includes at least four bits indicating the number of slots, and wherein the MAC CE includes one or more of:
five bits indicating a cell identifier (ID) containing an SRS resource set;
two bits indicating a bandwidth part (BWP) ID containing the SRS resource set;
one bit indicating whether normal uplink or supplemental uplink; or
four bits indicating the SRS resource set.

5. The UE of claim 1,
wherein the one or more SRS transmission occasions includes two or more SRS transmission occasions.

6. The UE of claim 1,
wherein the processor is further configured to cause the UE to:
determine a phase discontinuity between consecutive SRS transmission occasions, wherein the phase discontinuity is due to power control leading to different total transmit power in consecutive slots or due to a duplexing direction change between consecutive SRS transmission occasions;

indicate, to the base station, whether the UE is capable of correcting the phase discontinuity, wherein the indication whether the UE is capable of correcting the phase discontinuity is on an intra-band, intra-component carrier, or inter-band frequencies basis;

determine, based on the phase discontinuity, that an SRS transmission occasion is invalid; and skip an SRS transmission associated with the SRS transmission occasion that is invalid.

7. The UE of claim 1,
wherein the processor is further configured to cause the UE to:
determine that an SRS transmission occasion is invalid;
skip an SRS transmission associated with the SRS transmission occasion that is invalid; and
transmit the SRS transmission that was skipped in a next available slot.

8. The UE of claim 1,
wherein the configuration is indicated via physical layer signaling, wherein the physical layer signaling includes downlink control information (DCI), and wherein the DCI includes at least one field indicating the number of slots.

9. A base station, comprising:
a plurality of antennas;
a radio operably coupled to the plurality of antennas; and
a processor operably coupled to the radio;
wherein the processor is configured to cause the base station to:
transmit, to a user equipment device (UE), a configuration for SRS time domain bundling, wherein the configuration includes an indication of one or more SRS transmission occasions and includes an indication of a number of slots, wherein an SRS transmission occasion corresponds to a slot, and wherein the configuration is transmitted via at least one or a radio resource control (RRC) parameter, a medium access control (MAC) control element (CE), or downlink control information (DCI); and
receive, in accordance with the configuration for SRS time domain bundling, at least one SRS transmission during a corresponding SRS transmission occasion.

10. The base station of claim 9,
wherein the RRC parameter is one of an SRS-ResourceSet parameter or an SRS-Resource parameter.

11. The base station of claim 9,
wherein the RRC parameter includes a nrofSlots parameter to indicate the number of slots, and wherein an SRS transmission occasion corresponds to a slot.

12. The base station of claim 9,
wherein the MAC CE includes at least four bits indicating the number of slots, and wherein an SRS transmission occasion corresponds to a slot.

13. The base station of claim 9,
wherein the DCI includes at least one field indicating the number of slots, and wherein an SRS transmission occasion corresponds to a slot.

14. A baseband processor of a user device (UE) in a wireless communication system, comprising:
a memory; and
processing circuitry in communication with the memory and configured to:
receive, from a base station, a configuration for sounding reference signal (SRS) time domain bundling, wherein the configuration indicates one or more SRS transmission occasions and includes an indication of a number of slots, wherein an SRS transmission occasion corresponds to a slot, and wherein the configuration is received via higher layer signaling or physical layer signaling; and
generate instructions to transmit, in accordance with the configuration for SRS time domain bundling, at least one SRS transmission during a corresponding SRS transmission occasion.

15. The baseband processor of claim 14,
wherein the higher layer signaling includes at least one of a Radio Resource Control (RRC) parameter or a medium access control (MAC) control element (CE).

16. The baseband processor of claim 14,
wherein the configuration is indicated via a radio resource control (RRC) parameter, and wherein the RRC parameter is one of an SRS-ResourceSet parameter or an SRS-Resource parameter.

17. The baseband processor of claim 14,
wherein the one or more SRS transmission occasions include two or more SRS transmission occasions.

18. The baseband processor of claim 14,
wherein the processing circuitry is further configured to:
determine a phase discontinuity between consecutive SRS transmission occasions; and
indicate, to the base station, whether the UE is capable of correcting the phase discontinuity, wherein the indication whether the UE is capable of correcting the phase discontinuity is on an intra-band, intra-component carrier, or inter-band frequencies basis;
determine, based on the phase discontinuity, that an SRS transmission occasion is invalid; and
skip an SRS transmission associated with the SRS transmission occasion that is invalid.

19. The baseband processor of claim 14,
wherein the processing circuitry is further configured to:
determine that an SRS transmission occasion is invalid by determining that the SRS transmission occasion is invalid, the baseband processor is further configured to determine that a dynamic slot format indication (SFI) or a DCI format 2_0 configured a downlink (DL) symbol that collides with an SRS transmission, that a dynamic grant scheduling a dynamic channel state indicator (CSI) reference signal (RS) or a physical downlink shared channel (PDSCH) reception collides with an SRS transmission, or that an SRS transmission will collide with a semi-statically configured DL symbol; and
skip an SRS transmission associated with the SRS transmission occasion that is invalid.

20. The baseband processor of claim 14,
wherein the physical layer signaling includes downlink control information (DCI).

* * * * *